(12) United States Patent
Graves

(10) Patent No.: US 11,149,407 B2
(45) Date of Patent: Oct. 19, 2021

(54) EARTH-MOVING MACHINERY COLLISION THREAT FILTERING

(71) Applicant: Caterpillar Inc., Deerfield, IL (US)

(72) Inventor: Nolan Graves, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/212,107

(22) Filed: Dec. 6, 2018

(65) Prior Publication Data

US 2020/0181881 A1 Jun. 11, 2020

(51) Int. Cl.
*B60W 30/09* (2012.01)
*E02F 9/20* (2006.01)
(Continued)

(52) U.S. Cl.
CPC .......... *E02F 9/2025* (2013.01); *B60W 30/09* (2013.01); *E02F 9/24* (2013.01); *E02F 9/261* (2013.01);
(Continued)

(58) Field of Classification Search
CPC .......... E02F 9/2025; E02F 9/24; E02F 9/261; G08G 1/166; G08G 1/163; G08B 29/185;
(Continued)

(56) References Cited

U.S. PATENT DOCUMENTS 5,198,800 A 3/1993 Tozawa et al.
6,114,993 A 9/2000 Henderson et al.
(Continued)

FOREIGN PATENT DOCUMENTS

GB 622115.2 * 12/2016
JP 3461281 B2 10/2003
(Continued)

OTHER PUBLICATIONS

Safe Mine, "Installation and Maintenance Guide for Safemine Collision Avoidance Systems" Firmware Version 2.20 SMTOOL Version 1.30, © SafeMine Ltd. Switzerland, Mar. 1, 2011, 56 pages.

*Primary Examiner* — Hunter B Lonsberry
*Assistant Examiner* — Daniel M. Robert
(74) *Attorney, Agent, or Firm* — Harrity & Harrity LLP

(57) ABSTRACT

A method for collision threat filtering is disclosed. The method may include determining trajectory information associated with a plurality of machines. The method may include identifying, based on the trajectory information, one or more potential collisions among the plurality of machines, the one or more potential collisions including a potential collision between a first machine, of the plurality of machines, and a second machine of the plurality of machines. The method may include determining whether to filter the potential collision between the first machine and the second machine. Whether the potential collision is filtered may be determined based on a set of filtering parameters and machine information associated with at least one of the first machine or the second machine. The method may include selectively performing a collision prevention action, associated with the potential collision, based on whether the potential collision is to be filtered.

20 Claims, 9 Drawing Sheets

(51) Int. Cl.
  *G08G 1/16* (2006.01)
  *G08B 29/18* (2006.01)
  *E02F 9/26* (2006.01)
  *E02F 9/24* (2006.01)

(52) U.S. Cl.
  CPC ........... G08B 29/185 (2013.01); G08G 1/163 (2013.01); G08G 1/166 (2013.01); B60W 2300/17 (2013.01); B60W 2520/10 (2013.01); B60W 2710/18 (2013.01); B60W 2710/20 (2013.01)

(58) Field of Classification Search
  CPC ............. B60W 30/09; B60W 2710/20; B60W 2710/18; B60W 2520/10; B60W 2300/17
  See application file for complete search history.

(56) References Cited

U.S. PATENT DOCUMENTS

| | | | |
|---|---|---|---|
| 8,477,021 B2 | 6/2013 | Slack | |
| 9,267,249 B2 * | 2/2016 | Simon | E01C 23/127 |
| 9,562,334 B2 | 2/2017 | von der Lippe et al. | |
| 9,598,841 B2 | 3/2017 | Ikegami et al. | |
| 9,747,802 B2 | 8/2017 | Fisher et al. | |
| 9,815,461 B2 | 11/2017 | Miura et al. | |
| 2011/0137491 A1 * | 6/2011 | Self | E02F 5/145 |
| | | | 701/2 |
| 2015/0218762 A1 | 8/2015 | Berning et al. | |
| 2016/0053445 A1 | 2/2016 | Berning et al. | |
| 2016/0232771 A1 | 8/2016 | Mendiola et al. | |
| 2016/0325675 A1 * | 11/2016 | Bharwani | G08G 1/166 |
| 2017/0073935 A1 * | 3/2017 | Friend | E02F 9/265 |
| 2017/0160748 A1 | 6/2017 | Nakagawaa et al. | |
| 2017/0356140 A1 | 12/2017 | Neumann | |
| 2018/0178342 A1 | 6/2018 | Russell | |

FOREIGN PATENT DOCUMENTS

| | | | |
|---|---|---|---|
| JP | 2008303648 A | 12/2008 | |
| JP | 4412972 B2 * | 2/2010 | |
| JP | 4412972 B2 | 2/2010 | |
| JP | 6140105 B2 | 5/2017 | |
| WO | 2017180430 A1 | 10/2017 | |

* cited by examiner

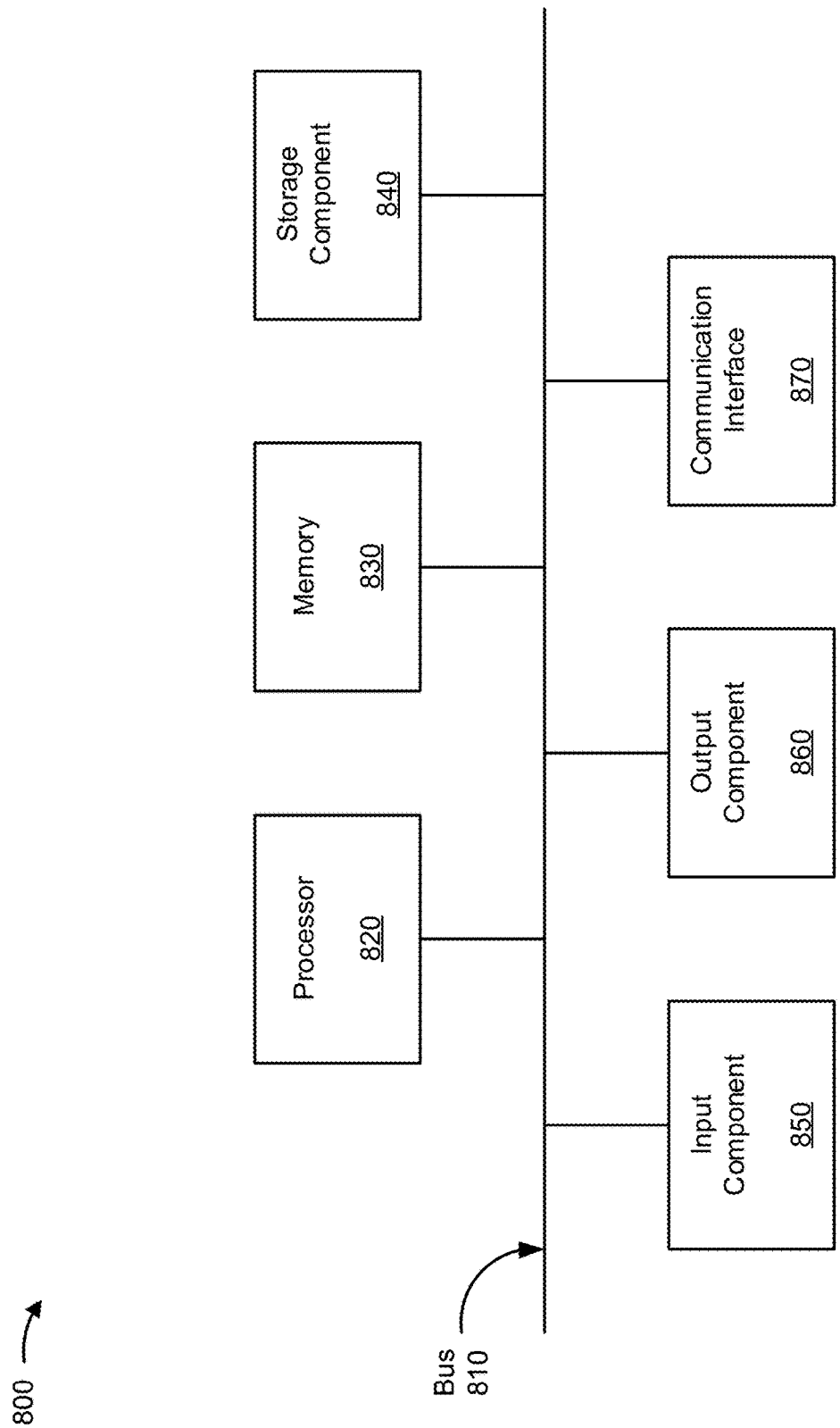

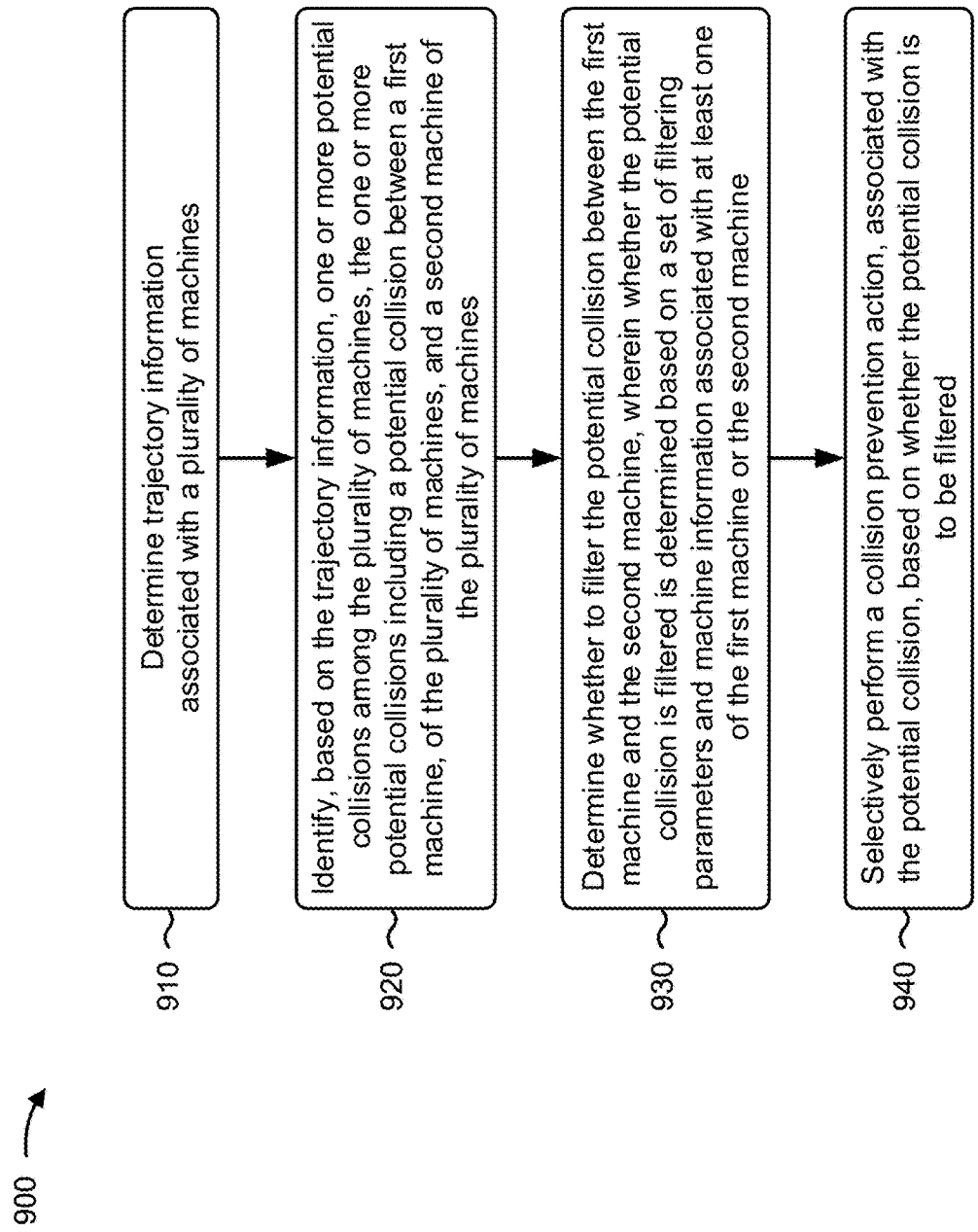

EARTH-MOVING MACHINERY COLLISION THREAT FILTERING

TECHNICAL FIELD

The present disclosure relates generally to earth-moving machinery and, more particularly, to collision threat filtering for earth-moving machinery.

BACKGROUND

A collision awareness and avoidance system (CAAS) is a system capable of providing collision awareness functionality and/or collision avoidance functionality to a machine (e.g., an earth-moving machine). For example, in terms of collision awareness, the CAAS may be capable of providing (e.g., to an operator of the machine, to a control system of the machine, and/or the like) spatial awareness of an obstacle (e.g., another machine, an object, a terrain feature, and/or the like) in proximity to the machine and/or a warning of a potential collision with the obstacle. In terms of collision avoidance, the CAAS may be capable of intervening in the operation of the machine in order to avoid a collision with an obstacle. Such intervention may include, for example, automatically applying a brake, automatically redirecting (e.g., steering) the machine, and/or the like.

In some cases, the CAAS may operate based on information determined by one or more devices affixed to, mounted on, or installed in the machine, such as a set of sensors (e.g., one or more radar sensors, one or more LiDAR sensors, and/or the like), a set of cameras, a location device (e.g., a Global Positioning System (GPS) receiver, a Global Navigation Satellite System (GNSS) receiver), and/or the like. Further, in some cases, the CAAS may operate based on information provided by another machine. In such cases, the CAAS may receive the information using one or more wireless communication technologies, such as vehicle-to-anything (V2X) technology, Bluetooth technology (e.g., Bluetooth Low Energy (BLE)), a wireless local area network technology (e.g., Wi-Fi), a cellular network technology (e.g., a Long-Term Evolution (LTE)), and/or the like.

In some applications, a machine configured with a CAAS may need to operate in close proximity to one or more other machines (with or without CAASs). For example, in the case of earth-moving machinery, a wheel loader may operate in close proximity to a haul truck (e.g., when the wheel loader is in the process of loading the haul truck). As another example, a hydraulic excavator may operate in close proximity to a haul truck (e.g., when the hydraulic excavator is in the process of loading the haul truck). As still another example, a track-type tractor may operate in close proximity to a hydraulic mining shovel (e.g., when the track-type tractor is cleaning an area near the hydraulic mining shovel). In such cases, as a result of the close proximity of operation between the machine and another machine, the CAAS of the machine may provide false alarms and/or may unnecessarily intervene with operation of the machine.

One attempt to detect and prevent a collision between a milling machine and a transport vehicle is disclosed in U.S. Patent Application No. 2016/0053445 ("the '445 application"). The stated object of the invention disclosed in the '445 application is to specify an automotive milling machine as well as a method for discharging milled material of a milling machine which, in all operating situations, prevents damage to the milling machine during the coordination of the discharging process.

In particular, the '445 application discloses a detection device to be arranged on a bottom side of a transport conveyor, associated with the milling machine, where the detection device is used to initiate an activation signal in case of the transport conveyor approaching an object—in particular, a rear wall of a loading surface of the transport vehicle. The '445 application further states that a preferred embodiment specifies a controller, in the presence of the activation signal, to generate a control signal for the reduction of the advance speed or for machine stoppage, and/or to increase the elevation angle of the transport conveyer, and/or to generate a drive signal for the vehicle driver of the transport vehicle. Further, the '445 application states that it may alternatively or additionally be specified for the controller, in the presence of the activation signal, to generate an alarm signal and/or a signal for the reduction of the conveyor belt speed.

While the milling machine and method of the '445 application may be designed to prevent a collision between a milling machine and a transport vehicle, as described above, the '445 application does not address the possibility of false alarms and/or unnecessary operational intervention that may come as a result of the close proximity of operation between the milling machine and the transport vehicle.

The collision threat filtering process of the present disclosure solves one or more of the problems set forth above and/or other problems in the art.

SUMMARY

According to some implementations, the present disclosure is related to a method comprising: determining, by a system, trajectory information associated with a plurality of machines; identifying, by the system and based on the trajectory information, one or more potential collisions among the plurality of machines, the one or more potential collisions including a potential collision between a first machine, of the plurality of machines, and a second machine of the plurality of machines; determining, by the system, whether to filter the potential collision between the first machine and the second machine, wherein whether the potential collision is filtered is determined based on a set of filtering parameters and machine information associated with at least one of the first machine or the second machine; and selectively performing, by the system, a collision prevention action, associated with the potential collision, based on whether the potential collision is to be filtered.

According to some implementations, the present disclosure is related to a system comprising one or more devices to: determine trajectory information associated with a plurality of machines; identify, based on the trajectory information, potential collisions among the plurality of machines, wherein the potential collisions include a potential collision between a first machine, of the plurality of machines, and a second machine of the plurality of machines; determine whether to filter the potential collision between the first machine and the second machine, wherein whether the potential collision is filtered is determined based on a set of filtering parameters and machine information associated with at least one of the first machine or the second machine; and selectively perform a collision prevention action, associated with the potential collision, based on whether the potential collision is to be filtered.

According to some implementations, the present disclosure is related to a machine comprising a system to: determine trajectory information associated with a plurality of machines, wherein the plurality of machines includes the machine; identify, based on the trajectory information, a potential collision between the machine and another machine of the plurality of machines; determine whether to filter the potential collision between the machine and the other machine, wherein whether the potential collision is filtered is determined based on a set of filtering parameters and machine information associated with at least one of the machine or the other machine; and selectively perform a collision prevention action, associated with the potential collision, based on whether the potential collision is to be filtered.

BRIEF DESCRIPTION OF THE DRAWINGS

FIG. 8 is a diagram of example components of one or more of the devices included the collision awareness and avoidance system described herein.

FIG. 9 is a flow chart of an example process for collision threat filtering for earth-moving machinery, as described herein.

DETAILED DESCRIPTION

This disclosure relates to an improved CAAS for collision threat filtering. The improved CAAS has universal applicability to any machine that can benefit from collision threat filtering. The term "machine" may refer to any machine that performs an operation associated with an industry such as, for example, mining, construction, farming, transportation, or any other industry. As some examples, the machine may be a wheel loader, a haul truck, an excavator (e.g., a hydraulic excavator), a tractor (e.g., a track-type tractor), a shovel (e.g., a hydraulic mining shovel), a vehicle, a backhoe loader, a cold planer, a compactor, a feller buncher, a forest machine, a forwarder, a harvester, an industrial loader, a knuckleboom loader, a material handler, a motor grader, a pipelayer, a road reclaimer, a skid steer loader, a skidder, a telehandler, a dozer, a tractor scraper, or other above ground equipment, underground equipment, marine equipment, or other types of machines that are subject to collisions with other machines.

FIGS. 1-5 are diagrams associated with various example implementations of collision threat filtering. For the purposes of FIGS. 1-5, a group of machines (e.g., machine 1 through machine N (N>1)) are in or near a work area in which each of the group of machines may operate.

Figure 1:
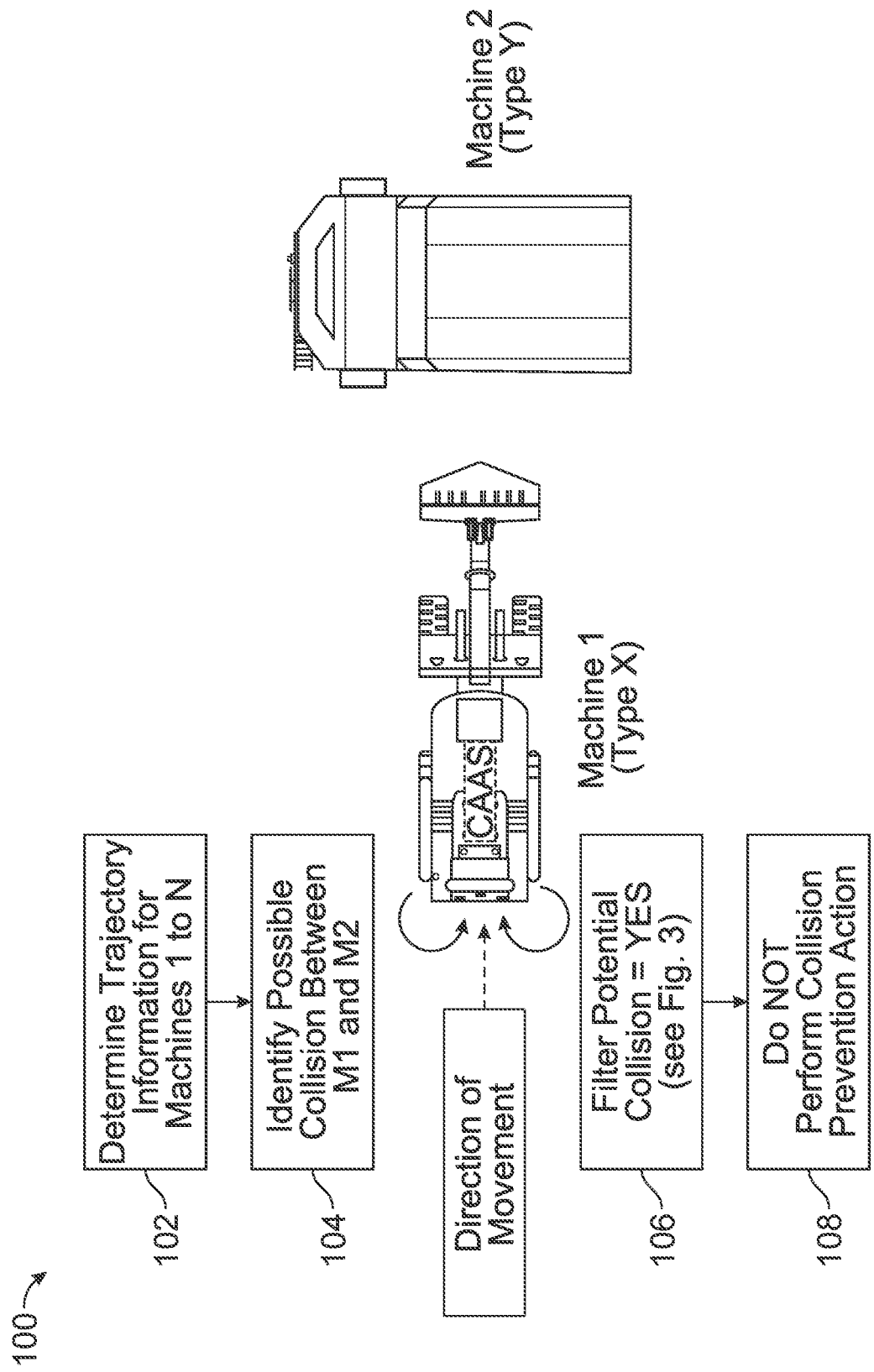
FIGS. 1-5 are diagrams associated with various example implementations of collision threat filtering described herein.

FIG. 1 is a diagram illustrating an example 100 in which an improved CAAS filters a potential collision. As shown in FIG. 1, a first machine (identified as machine 1 (M1)) may be configured with an improved CAAS (hereinafter referred to as the CAAS), and may be a first type of machine (e.g., type X). As indicated in FIG. 1, the first machine may be operating in close proximity to a second machine (identified as machine 2 (M2)), which may be another type of machine (e.g., type Y). As a particular example, and as illustrated in the example of FIG. 1, the first machine may be a wheel loader and the second machine may be a haul truck. Here, the wheel loader may need to operate in close proximity to the haul truck (e.g., when the wheel loader is in the process of loading the haul truck). In some implementations, the second machine may also be configured with a CAAS (not shown).

The CAAS of the first machine may operate to identify potential collisions between the first machine and other machines of the group of N machines. In some implementations, as shown by reference number 102, in order to detect these potential collisions, the CAAS may determine trajectory information associated with the group of N machines. The trajectory information for a given machine may include information that identifies a location of the machine as a function of time (e.g., such that a location of the machine may be identified as a function of time). In some implementations, the CAAS may determine trajectory information for a given machine based on information that identifies a speed of the given machine, information that identifies a direction of movement of the given machine, information that identifies an acceleration rate of the given machine, information that identifies a current location of the given machine, information that identifies a destination of the given machine (e.g., information that identifies a location to which the given machine is moving), and/or the like. In some implementations, the CAAS may determine trajectory information for the first machine and one or more other machines of the group of N machines.

In some implementations, the CAAS may determine the trajectory information based on information gathered or collected by the CAAS of the first machine. For example, the CAAS may determine the trajectory information using a set of sensors of the CAAS (e.g., one or more radar sensors, one or more LiDAR sensors, a speed sensor, an imaging system, and/or the like), a set of cameras of the CAAS, a location device associated with the first machine (e.g., a GPS receiver, a GNSS receiver, and/or the like), and/or the like.

Additionally, or alternatively, the CAAS may determine the trajectory information based on information provided by a device or a system of another machine. For example, the CAAS may receive, from another CAAS configured on another machine, information determined using a set of sensors of the other CAAS, a set of cameras of the other CAAS, a location device associated with the other machine, and/or the like. In some implementations, the CAAS may receive information from a device or a system, associated with another machine, using V2X technology, Bluetooth technology, a wireless local area network technology, a cellular network technology, and/or the like.

In some implementations, based on the trajectory information, the CAAS may identify one or more potential collisions between the first machine and any of the group of N machines. For example, the CAAS may compare a trajectory of the first machine to respective trajectories of each of the other machines in the group of N machines, and may determine, based on those comparisons, whether the first machine would be in the same location as another machine at a given time (which is indicative of a potential collision). In some implementations, the CAAS may determine whether the first machine will potentially collide with another machine based on determining whether the trajectory information indicates that a body area of the first machine and/or a work tool area of the first machine will overlap a body area of the other machine and/or a work tool area of the other machine at a future point in time.

A body area of a machine is an area defined by a body of the machine (e.g., an area corresponding to a chassis, wheels, an engine compartment, and/or the like), while a work tool area is an area defined by a work tool of the machine (e.g., an area corresponding to a bucket, a shovel, a boom, an arm, and/or the like). In some implementations, a size (e.g., a length, a width, a height) of a body area and/or a size of a work tool area may depend on a type of the machine. In other words, different types of machines can be associated with differently sized body areas and/or work tool areas.

Figure 2:
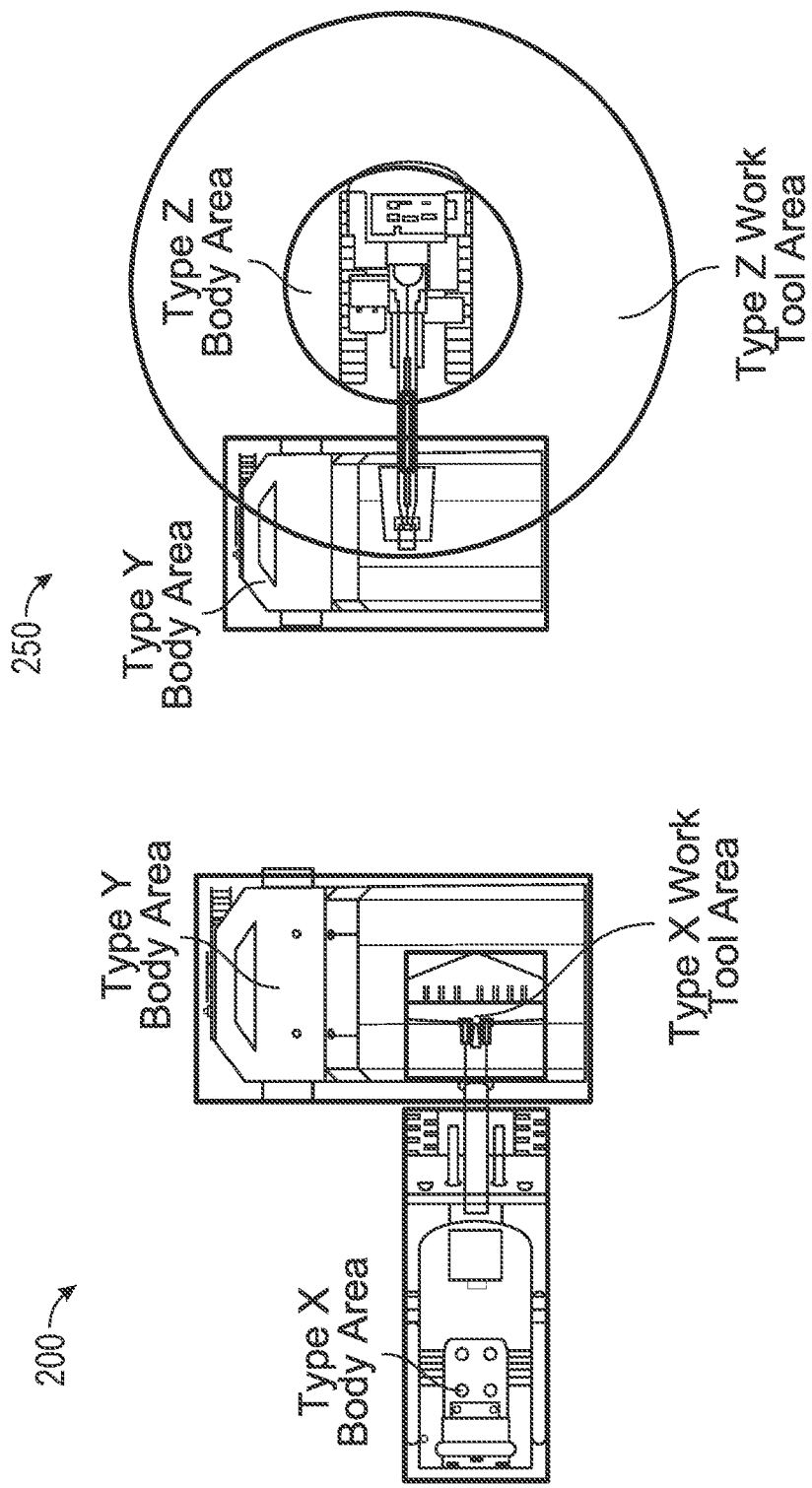

FIG. 2 is a diagram illustrating examples 200 and 250 of body areas and work tool areas associated with example types of machines. As shown by example 200 of FIG. 2, a type X machine (e.g., a wheel loader) is associated with a body area (e.g., a rectangular area corresponding to a body of the wheel loader) and a work tool area (e.g., a rectangular area corresponding to a bucket of the wheel loader). As further shown, a type Y machine (e.g., a haul truck) is associated with a body area only (e.g., a rectangular area corresponding to the entire haul truck). As shown by example 250 of FIG. 2, a type Z machine (e.g., an excavator) is associated with a body area (e.g., a circular area corresponding to a body of the excavator) and a work tool area (e.g., a circular area corresponding to possible positions of a bucket of the excavator). As shown in FIG. 2, a shape of the body area and/or a shape of the work tool area for a given machine may depend on whether the machine is a rotational machine (e.g., a machine capable of rotating its body or work tool while remaining in the same location, such as the excavator) or a linear machine (e.g., a non-rotational machine, such as the wheel loader or the haul truck).

In some implementations, when identifying one or more potential collisions between the first machine and any of the other N machines, the CAAS may ignore a work tool area (e.g., such that the work tool area of the first machine or another machine is not taken into consideration when identifying a possible collision). In some implementations, whether the work tool area is ignored may be based on a type of the first machine and a type of the other machine. For example, the CAAS may be configured to ignore a work tool area of a type X machine (e.g., a wheel loader) when identifying a potential collision between the type X machine and a type Y machine (e.g., a haul truck) since, for example, work tool areas of type X machines will overlap body areas of type Y machines in operation (e.g., since, during the loading process, a bucket of a wheel loader will be above a bed of a haul truck).

Returning to FIG. 1, and as indicated by reference number 104, assume that the CAAS identifies a potential collision between the first machine and the second machine. For example, assume that the CAAS determines, based on the trajectory information, that a body area of the first machine will overlap the body area of the second machine at a future point in time, thereby indicating a potential collision between the first machine and the second machine.

As further shown in FIG. 1, and by reference number 106, the CAAS may determine whether to filter the potential collision between the first machine and the second machine. In some implementations, filtering the potential collision means that the CAAS does not perform a collision prevention action. For example, when filtering a potential collision, the CAAS would not provide a collision warning (e.g., a visual alarm to an operator of the machine, an audible alarm to the operator of the machine, a signal to a controller of the machine, and/or the like) and/or would not perform a collision avoidance action (e.g., automatic braking, automatic steering, and/or the like) associated with avoiding the potential collision.

In some implementations, the CAAS may determine whether to filter the potential collision based on a set of filtering parameters and machine information associated with the first machine and/or the second machine.

The set of filtering parameters includes one or more parameters based on which the CAAS determines whether to filter a potential collision. For example, the set of filtering parameters may include a maximum filtering speed associated with the first machine, a maximum filtering speed associated with the second machine, a filter map associated with the first machine, and/or a filter map associated with the second machine. In some implementations, the CAAS may determine the set of filtering parameters based on information stored or accessible by the CAAS (e.g., when the set of filtering parameters is configured on the CAAS) and/or based on information received by the CAAS (e.g., when the CAAS receives information associated with the set of filtering parameters from another device, such as a device or system associated with the second machine, a server on a work site, and/or the like).

A maximum filtering speed includes information that identifies a maximum machine speed at which filtering may be performed. In some implementations, the maximum filtering speed can be associated with a particular type of machine (e.g., such that different types of machines can be associated with different maximum filtering speeds). Additionally, or alternatively, the maximum filtering speed can be associated with a particular machine (e.g., such that different machines of the same type can be associated with different maximum filtering speeds). Additionally, in some implementations, the maximum filtering speed can depend on a direction of movement. For example, a maximum filtering speed for a type X machine moving in a forward direction can differ from (e.g., be greater or less than) a maximum filtering speed for the type X machine moving in a reverse direction.

A filter map, associated with a given machine, includes information that identifies one or more allowable approach directions associated with a given machine, where an allowable approach direction associated with a given machine is a direction from which another machine is allowed to approach the given machine, from the perspective of the given machine (regardless of whether one or both of the given machine and the other machine are moving). An allowable approach direction may be a linear approach direction (e.g., a direction relative to a longitudinal direction of a linearly movable machine) or may be a rotational approach direction (e.g., a direction relative to a radial direction of a rotationally movable machine, where the radial direction is a vector from an approximate center of the rotationally movable machine to an approximate center of another machine).

In some implementations, the filter map can be associated with a particular type of machine (e.g., such that different types of machines can be associated with different allowable approach directions). Additionally, or alternatively, the filter map can be associated with a particular machine (e.g., such that different machines of the same type can be associated with different allowable approach directions).

Additionally, or alternatively, the filter map may depend on the types of machines associated with the potential collision. For example, for potential collisions between type X machines and type Y machines, a filter map for a given type X machine may identify a first set of allowable approach directions. Conversely, for potential collisions between type X machines and type Z machines, a filter map for a given type X machine may identify a second set of allowable approach directions that differs from the first set of allowable approach directions.

Figure 3:
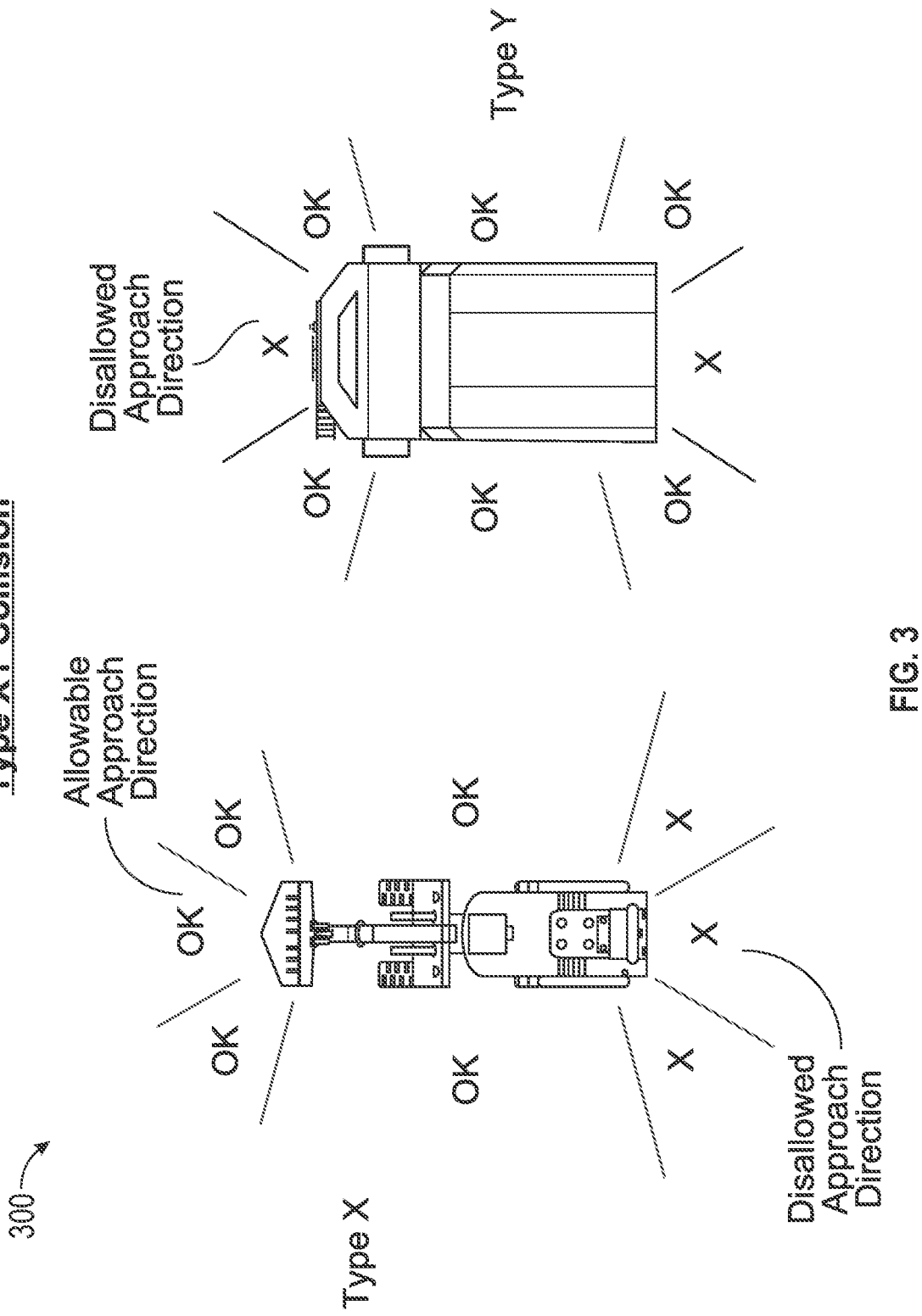
Figure 4:
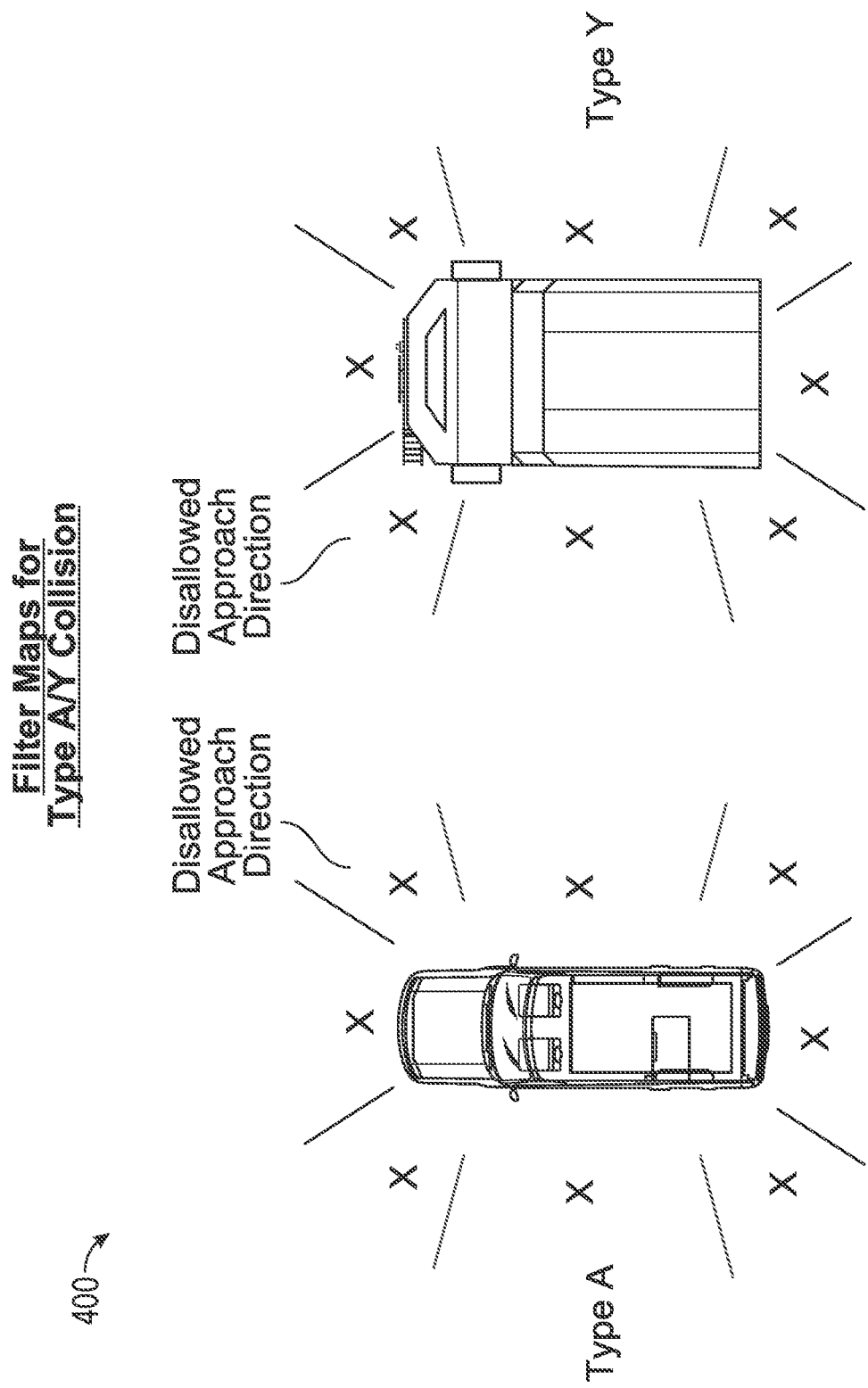

FIGS. 3 and 4 provide illustrative examples 300 and 400, respectively, of filter maps that depend on types of machines associated with a potential collision. As shown in FIG. 3, in the case of a potential collision between a type X machine and a type Y machine, a filter map for a given type X machine may indicate that left, front-left, front, front-right, and right approach directions are allowed (e.g., that, from the perspective of a given type X machine, a type Y machine can approach from the left, front-left, front, front-right, and right). As further shown, the filter map for the given type X machine may indicate that rear-left, rear, and rear-right approach directions are disallowed (e.g., that, from the perspective of a given type X machine, a type Y machine cannot approach from the rear-left, rear, or rear-right). As further shown in FIG. 3, a filter map for a given type Y machine may indicate that front-left, left, rear-left, front-right, right, and rear-right approach directions are allowed (e.g., that, from the perspective of a given type Y machine, a type X machine can approach from the front-left, left, rear-left, front-right, right, and rear-right), and that front and rear approach directions are disallowed (e.g., that, from the perspective of a given type Y machine, a type X machine cannot approach from the front or rear).

In the example shown in FIG. 4, in the case of a potential collision between a type A machine (e.g., a vehicle) and a type Y machine, a filter map for a given type A machine may indicate that all approach directions are disallowed (e.g., that, from the perspective of a given type A machine, a type Y machine cannot approach from any direction). As further shown, a filter map for a given type Y machine may also indicate that all approach directions are disallowed (e.g., that, from the perspective of a given type Y machine, a type A machine cannot approach from any direction). Notably, in the examples shown in FIGS. 3 and 4, the filter map for a given type Y machine depends on the type of machine with which the given type Y machine has a potential collision (e.g., the type Y filter map of FIG. 3 would be used for a potential collision with a type X machine, and the type Y filter map of FIG. 4 would be used for a potential collision with a type A machine).

Additionally, or alternatively, the filter map may depend on one or more of the particular machines associated with the potential collision. For example, for a potential collision between a first type X machine and a first type Y machine, a filter map for the first type X machine may identify a first set of allowable approach directions. Conversely, for a potential collision between a second type X machine and the first type Y machine, a filter map for the second type X machine may identify a second set of allowable approach directions that differs from the first set of allowable approach directions.

Additionally, or alternatively, the filter map may depend on a payload status of a given machine. For example, a first filter map, identifying a first set of allowable approach directions for type Y machines, may be used when a given type Y machine is carrying a payload (e.g., when a haul truck is loaded). Conversely, a second filter map, identifying a second (i.e., different) set of allowable approach directions for type Y machines, may be used when the given type Y machine is not carrying a payload (e.g., when a haul truck is empty). In some implementations, the CAAS may be configured to assume that a given machine is not carrying a payload unless the CAAS determines otherwise. Alternatively, the CAAS may be configured to assume that a given machine is carrying a payload unless the CAAS determines otherwise.

Machine information includes information associated with a given machine involved in the potential collision. For example, the machine information may include information that identifies a type of the first machine, information that identifies a type of the second machine, information that identifies the first machine (e.g., a machine identifier, a machine identification number, and/or the like), information that identifies the second machine, and/or the like. As another example, the machine information may include information that identifies an approach direction associated with the first machine (e.g., information that identifies an approach direction of the second machine from the perspective of the first machine), an approach direction associated with the second machine (e.g., information that identifies an approach direction of the first machine from the perspective of the second machine), a speed of the first machine, a speed of the second machine, and/or the like. In some implementations, an approach direction associated with a linear machine (e.g., a wheel loader, a haul truck, a vehicle, and/or the like) is relative to a longitudinal direction of the linear machine. In some implementations, an approach direction for a rotational machine is relative to a radial vector of the rotational machine, where the radial vector is a vector from an approximate center of the rotational machine to a center of the other machine associated with the potential collision.

In some implementations, the CAAS may determine the machine information based on information stored or accessible by the CAAS. For example, the CAAS may be configured with information that identifies a type of the first machine. Additionally, or alternatively, the CAAS may determine the machine information based on information received by the CAAS. For example, the CAAS may receive, from a device associated with the second machine, information that identifies the type of the second machine.

Additionally, or alternatively, the CAAS may determine the machine information based on information determined by the CAAS. For example, the CAAS may determine information that identifies the type of the second machine based on information gathered by one or more sensors and/or one or more cameras associated with the CAAS (e.g., when the second machine cannot or does not provide information that identifies the type of the second machine to the CAAS). As another example, the CAAS may determine information that identifies an approach direction associated with the first machine and/or an approach direction associated with the second machine based on information gathered by the one or more sensors and/or the one or more cameras associated with the CAAS. In some implementations, the CAAS may determine one or more items of machine information (e.g., the approach direction associated with the first machine, the approach direction associated with the second machine, the speed of the first machine, the speed of the second machine, and/or the like) based on the trajectory information.

In some implementations, the CAAS may determine whether to filter the potential collision based on whether the speed of the first machine is less than or equal to the maximum filtering speed of the first machine, and based on whether the speed of the second machine is less than or equal to the maximum filtering speed of the second machine. For example, the CAAS may compare the speed of the first machine and the maximum filtering speed of the first machine, and may compare the speed of the second machine and the maximum filtering speed of the second machine. Here, if the CAAS determines that the speed of the first machine is greater than the maximum filtering speed of the first machine, or that the speed of the second machine is greater than the maximum filtering speed of the second machine, then the CAAS may determine that the potential collision is not to be filtered (e.g., since at least one of the first or second machines is moving above a respective maximum filtering speed). Conversely, if the CAAS determines that the speed of the first machine is less than or equal to the maximum filtering speed of the first machine, and that the speed of the second machine is less than or equal to the maximum filtering speed of the second machine, then the CAAS may determine that the potential collision may be filtered (e.g., depending on whether approach direction filtering is to be applied, as described below). In some implementations, such speed filtering may be applied since, generally, machines are expected to operate in close proximity to one another while moving at relatively low speeds. Thus, speed filtering may be implemented in order to prevent a potential collision from being filtered when a given machine, associated with the potential collision, is moving at an unsafe or unexpected speed (e.g., even though the approach direction associated with the given machine may be permissible, as described below).

Additionally, or alternatively, the CAAS may determine whether to filter the potential collision based on whether the approach direction associated with the first machine is an allowable approach direction associated with the first machine, and based on whether the approach direction associated with the second machine is an allowable approach direction for the second machine. For example, the CAAS may compare the approach direction associated with the first machine and the filter map associated with the first machine, and may compare the approach direction associated with the second machine and the filter map associated with the second machine. Here, if the CAAS determines that the approach direction associated with the first machine is a disallowed approach direction (e.g., that the approach direction of the second machine, from the perspective of the first machine, does not match an allowable approach direction), or that the approach direction associated with the second machine is a disallowed approach direction (e.g., that the approach direction of the first machine, from the perspective of the second machine, does not match an allowable approach direction), then the CAAS may determine that the potential collision is not to be filtered.

Conversely, if the CAAS determines that the approach direction associated with the first machine is an allowable approach direction (e.g., that the approach direction of the second machine, from the perspective of the first machine, matches an allowable approach direction) and that the approach direction associated with the second machine is an allowable approach direction (e.g., that the approach direction of the first machine, from the perspective of the first machine, matches an allowable approach direction), then the CAAS may determine that the potential collision may be filtered (e.g., depending on whether speed filtering is to be applied, as described above).

In some implementations, the CAAS may determine whether to filter the potential collision based on evaluating whether to apply both speed filtering and approach direction filtering in the manner described above. For example, the CAAS may first determine whether to filter the potential collision based on a speed of the first machine and a speed of the second machine. Here, if the CAAS determines that the potential collision can be filtered on the basis of speed (e.g., when the CAAS determines that the speeds of the first and second machines are less than or equal to respective maximum filtering speeds), then the CAAS may next determine whether the potential collision can be filtered on the basis of approach direction (e.g., based on whether the approach directions associated with the first and second machines are allowable approach directions).

As further shown by reference number 106, the CAAS may determine that the potential collision between the first machine and the second machine is to be filtered. For example, the CAAS may determine that the speed of the first machine and the speed of the second machine are both less than or equal to respective maximum filtering speeds, and that the approach direction associated with the first machine and the approach direction associated with the second machine match respective allowable approach directions. Here, as shown by reference number 108, the CAAS does not perform a collision prevention action associated with the potential collision. For example, the CAAS may not provide a collision warning and/or may not perform a collision avoidance action associated with avoiding the potential collision. In other words, the CAAS may operate such that no collision warning, associated with the potential collision, is provided and such that no collision avoidance action, associated with avoiding the potential collision, is performed.

Figure 5:
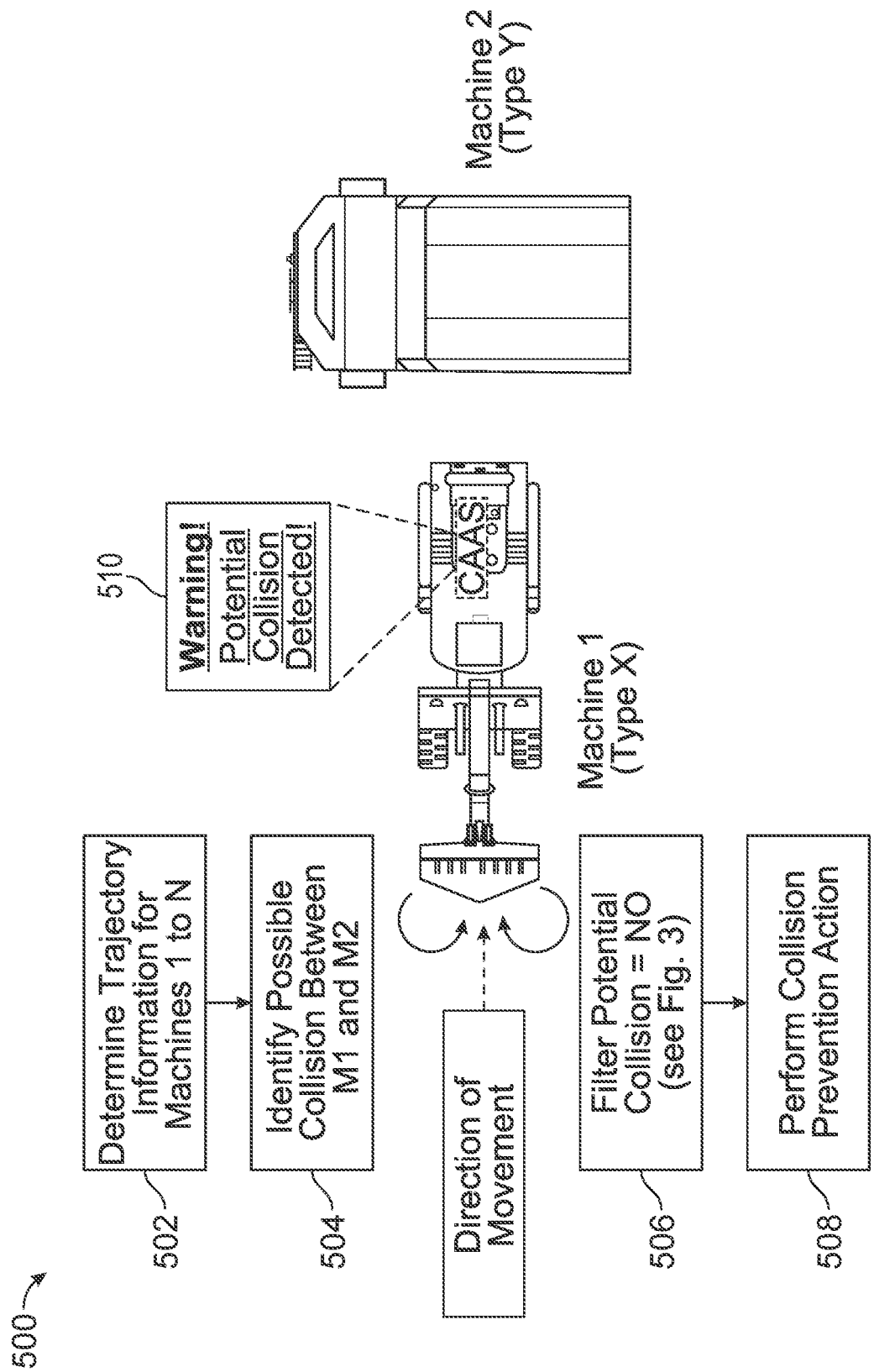

FIG. 5 is a diagram illustrating an example 500 in which the CAAS does not filter a potential collision. Example 500 is similar to example 100 except that the first machine is facing an opposite direction in example 500 as compared to example 100 (the bucket of the wheel loader is facing left in example 500, as compared to facing right in example 100).

As shown by reference number 502, the CAAS of the first machine may determine trajectory information associated with the group of N machines (e.g., in a manner similar to that described above with regard to reference number 102). Further, as shown by reference number 504, may identify a potential collision between the first machine and the second machine (e.g., in a manner similar to that described above with regard to reference number 104).

Next, the CAAS may determine whether the potential collision is to be filtered (e.g., in a manner similar to that described above in association with reference number 106). In example 500, as shown by reference number 506, the CAAS determines that the potential collision is not to be filtered. For example, the CAAS may determine that the approach direction associated with the first machine is a disallowed approach direction (e.g., since, from the perspective of the first machine, the second machine is approaching the first machine from the disallowed rear direction identified in FIG. 3).

As shown by reference number 508, based on determining that the potential collision is not to be filtered, the CAAS may perform a collision prevention action associated with the potential collision. In some implementations, the collision prevention action may include providing (e.g., to an operator of the first machine, to an operator of the second machine, to a controller of the first machine, to a controller of the second machine, and/or the like) a collision warning and/or performing a collision avoidance action associated with avoiding the potential collision (e.g., by automatically applying a brake of the first machine, by automatically steering the first machine in a direction so as to avoid the potential collision). For example, as shown by reference number 510, the CAAS may provide, for display to an operator of the first machine, a collision warning associated with the potential collision.

In this way, a CAAS may selectively perform a collision prevention action, associated with a potential collision, based on whether the potential collision is to be filtered, thereby allowing a machine to operate in close proximity to one or more other machines, while preventing false alarms and/or unnecessary intervention with operation of the machine.

As indicated above, FIGS. 1-5 are provided as examples. Other examples may differ from what is described in connection with FIGS. 1-5.

Figure 6:
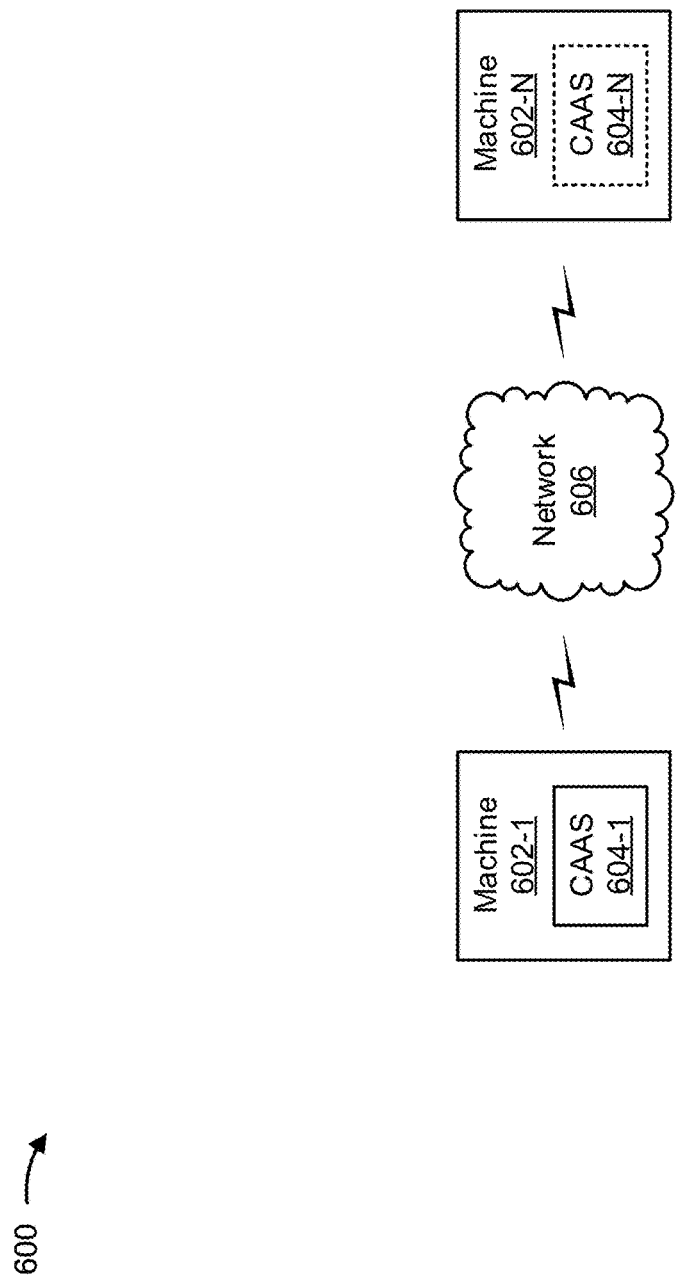
FIG. 6 is a diagram of an example environment in which systems and/or methods described herein may be implemented.

FIG. 6 is a diagram of an example environment 600 in which systems and/or methods, described herein, may be implemented. As shown in FIG. 6, environment 600 may include a group of machines 602 (e.g., including machine 602-1 through machine 602-N(N>1)) and a network 606. As further shown, machine 602-1 includes a CAAS 604 (identified as CAAS 604-1), while machine 602-N may optionally include a CAAS 604 (identified as CAAS 604-N).

Machine 602 includes a linearly movable and/or a rotationally movable machine for which collision awareness and/or collision avoidance functionality may be provided, as described herein. For example, machine 602 may include a wheel loader, a haul truck, an excavator (e.g., a hydraulic excavator), a tractor (e.g., a track-type tractor), a shovel (e.g., a hydraulic mining shovel), a mining truck, a passenger vehicle (e.g., a pickup truck), a backhoe loader, a cold planer, a compactor, a feller buncher, a forest machine, a forwarder, a harvester, an industrial loader, a knuckleboom loader, a material handler, a motor grader, a pipelayer, a road reclaimer, a skid steer loader, a skidder, a telehandler, a dozer, a tractor scraper, or other above ground equipment, underground equipment, or marine equipment. In some implementations, machine 602 may be configured with a CAAS 604.

CAAS 604 includes a system (e.g., one or more devices) capable of providing collision awareness and/or avoidance functionality associated with machine 602, and collision threat filtering associated with the collision awareness and/or avoidance functionality, as described herein. Additional details regarding devices included in CAAS 604 are described below with regard to FIG. 7.

Network 606 includes one or more wired and/or wireless networks. For example, network 606 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of machines, devices, and networks shown in FIG. 6 are provided as an example. In practice, there may be additional machines, systems, and/or networks, fewer machines, systems, and/or networks, different machines, systems, and/or networks, or differently arranged machines, systems, and/or networks than those shown in FIG. 6. Furthermore, two or more systems shown in FIG. 6 may be implemented within a single system, or a single system shown in FIG. 6 may be implemented as multiple, distributed systems. For example, while CAAS 604 is illustrated as being configured on machine 602-1 and (optionally) machine 602-N, in some implementations, CAAS 604 may be remote from machines 602.

Figure 7:
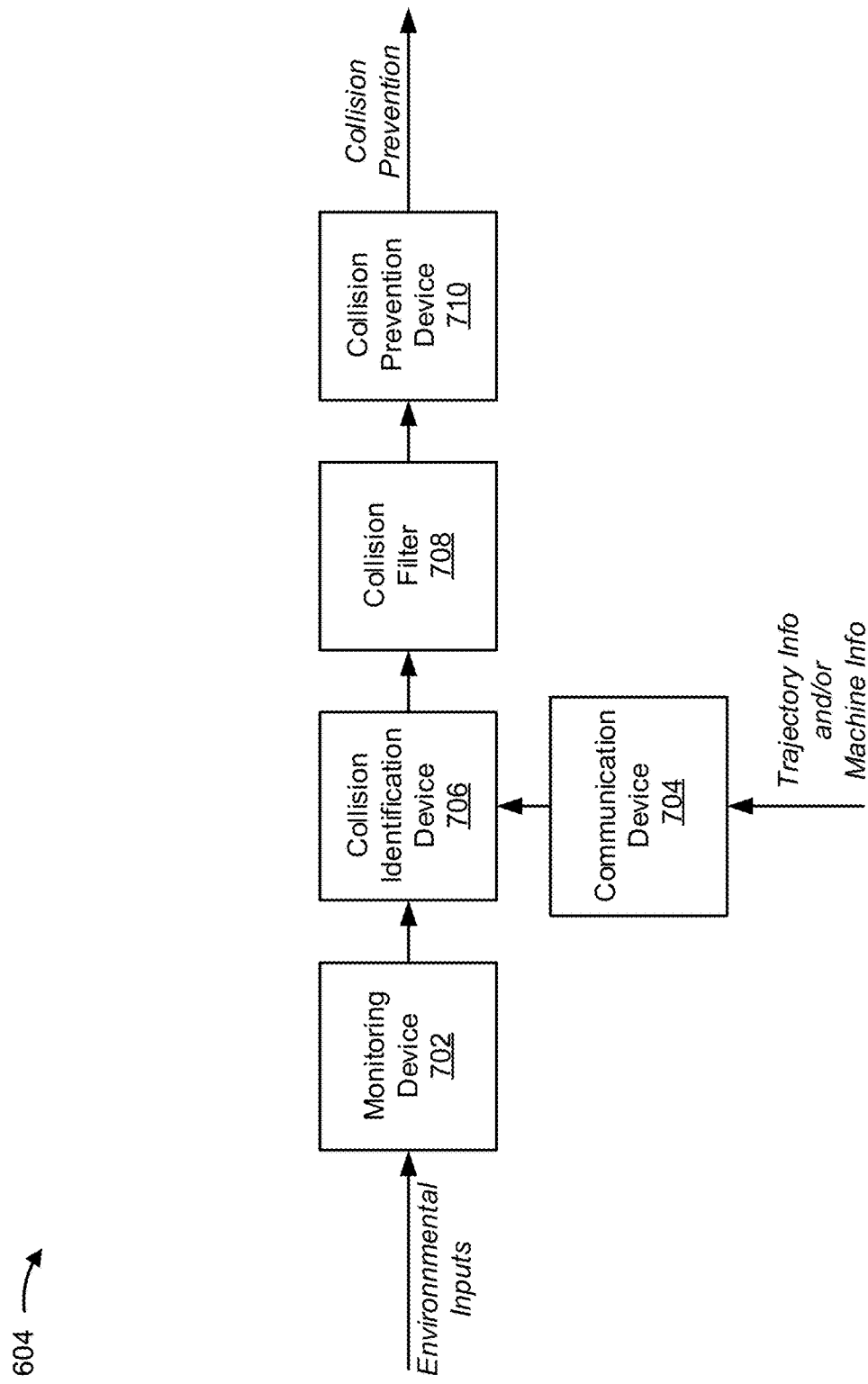
FIG. 7 is a diagram of example devices included in a collision awareness and avoidance system described herein.

FIG. 7 is a diagram of an example implementation of CAAS 604 described herein. As shown in FIG. 7, CAAS 604 may include a monitoring device 702, a communication device 704, a collision identification device 706, a collision filter 708, and a collision prevention device 710. CAAS 604 may interconnect via wired connections, wireless connections, or a combination of wired and wireless connections.

Monitoring device 702 includes one or more devices capable of gathering, collecting, or receiving environmental inputs to CAAS 604 in association with determining trajectory information and/or machine information, as described herein. For example, monitoring device 702 may include a set of sensors (e.g., one or more radar sensors, one or more LiDAR sensors, a speed sensor, and/or the like), a set of cameras, a location device (e.g., a GPS receiver, a GNSS receiver, and/or the like), and/or another type of device. In some implementations, monitoring device 702 may be capable of gathering or collecting environmental information, based on which CAAS 604 may determine trajectory information and/or machine information associated with one more machines 602.

Communication device 704 includes a device capable of sending and/or receiving communications from another device or system in association with determining trajectory information and/or machine information, as described herein. For example, communication device 704 may include a communication device (e.g., a wireless communication device) capable of sending information to and/or receiving information from a CAAS 604 configured on another machine 602. In some implementations, communication device 704 may be capable of receiving information based on which CAAS 604 may determine trajectory information and/or machine information associated with one more machines 602.

Collision identification device 706 is a device capable of identifying, based on trajectory information, one or more potential collisions among a plurality of machines 602, as described herein. In some implementations, collision identification device 706 may identify the one or more potential collisions based on information provided to collision identification device 706 by monitoring device 702 and/or communication device 704.

Collision filter 708 is a device capable of determining to filter a potential collision between a first machine 602 and a second machine 602, as described herein. In some implementations, collision filter 708 may determine whether the potential collision is to be filtered based on a set of filtering parameters and machine information associated with at least one of the first machine 602 or the second machine 602, as described herein.

Collision prevention device 710 is a device capable of selectively performing a collision prevention action, associated with a potential collision, based on whether the potential collision is to be filtered, as described herein. For example, collision prevention device 710 may include an operator interface device, such as a display device (e.g., a display screen via which a visual warning can be displayed), an audio device (e.g., a speaker via which an audible warning can be played), and/or the like. As another example, collision prevention device 710 may include a device capable of providing a signal to a controller of machine 702 in order to cause a collision prevention action to be automatically performed.

The number and arrangement of devices shown in FIG. 7 are provided as an example. In practice, there may be additional devices, fewer devices, different devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of CAAS 604 may perform one or more functions described as being performed by another set of devices of CAAS 604.

FIG. 8 is a diagram of example components of a device 800. Device 800 may correspond to one or more devices of CAAS 604, such as monitoring device 702, communication device 704, collision identification device 706, collision filter 708, and/or collision prevention device 710. In some implementations, the one or more devices of CAAS 604 may include one or more devices 800 and/or one or more components of device 800. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 is implemented in hardware, firmware, and/or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes based on processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

FIG. 9 is a flow chart of an example process 900 for collision threat filtering, as described herein. In some implementations, one or more process blocks of FIG. 9 may be performed by a CAAS, such as CAAS 604.

As shown in FIG. 9, process 900 may include determining trajectory information associated with a plurality of machines (block 910). For example, the CAAS (e.g., using monitoring device 702, communication device 704, and/or the like) may determine trajectory information associated with a plurality of machines (e.g., a plurality of machines 602), as described herein.

As further shown in FIG. 9, process 900 may include identifying, based on the trajectory information, one or more potential collisions among the plurality of machines (block 920). For example, the CAAS (e.g., using collision identification device 706, and/or the like) may identify, based on the trajectory information, one or more potential collisions among the plurality of machines, as described herein. In some implementations, the one or more potential collisions may include a potential collision between a first machine of the plurality of machines (e.g., machine 602-1), and a second machine of the plurality of machines (e.g., machine 602-2).

As further shown in FIG. 9, process 900 may include determining whether to filter the potential collision between the first machine and the second machine (block 930). For example, the CAAS (e.g., using collision filter 708, and/or the like) may determine whether to filter the potential collision between the first machine and the second machine, as described herein. In some implementations, whether the potential collision is filtered is determined based on a set of filtering parameters and machine information associated with at least one of the first machine or the second machine, as described herein.

As further shown in FIG. 9, process 900 may include selectively performing a collision prevention action, associated with the potential collision, based on whether the potential collision is to be filtered (block 940). For example, the CAAS (e.g., using collision prevention device 710, and/or the like) may selectively perform a collision prevention action, associated with the potential collision, based on whether the potential collision is to be filtered, as described herein.

Process 900 may include additional implementations, such as any single implementation or any combination of implementations described below and/or in connection with one or more other processes described elsewhere herein.

In some implementations, when determining whether to filter the potential collision, the CAAS determines whether a speed of the first machine is less than or equal to a maximum filtering speed of the first machine; and determines whether a speed of the second machine is less than or equal to a maximum filtering speed of the second machine. In some implementations, the set of filtering parameters includes information that identifies the maximum filtering speed of the first machine and the maximum filtering speed of the second machine. In some implementations, the machine information includes information that identifies the speed of the first machine and the speed of the second machine.

In some implementations, when determining whether to filter the potential collision, the CAAS determines whether an approach direction, associated with the first machine, matches one of a set of allowable approach directions associated with the first machine, and determines whether an approach direction, associated with the second machine, matches one of a set of allowable approach directions associated with the second machine. In some implementations, the set of filtering parameters includes information that identifies the set of allowable approach directions associated with the first machine and the set of allowable approach directions associated with the second machine. In some implementations, the machine information includes information that identifies the approach direction associated with the first machine and the approach direction associated with the second machine.

In some implementations, the CAAS identifies the set of allowable approach directions associated with the first machine and the set of allowable approach directions associated with the second machine based on at least one of a type of the first machine and a type of the second machine and/or an identifier of the first machine and an identifier of the second machine. In some implementations, the set of allowable approach directions associated with the first machine and the set of allowable approach directions associated with the second machine are sets of linear approach directions. In some implementations, the set of allowable approach directions associated with the first machine is a set of linear approach directions and the set of allowable approach directions associated with the second machine is a set of radial approach directions. In some implementations, the set of allowable approach directions associated with the second machine is a set of linear approach directions and the set of allowable approach directions associated with the first machine is a set of radial approach directions.

In some implementations, when the potential collision is filtered, the CAAS, when selectively performing the collision prevention action, operates such that no collision warning, associated with the potential collision, is provided and such that no collision avoidance action, associated with avoiding the potential collision, is performed.

In some implementations, when the potential collision is not to be filtered, the CAAS, when selectively performing the collision prevention action, provides a collision warning in association with warning an operator of the potential collision and/or causes a collision avoidance action, associated with avoiding the potential collision, to be performed.

In some implementations, when identifying the potential collisions among the plurality of machines, the CAAS ignores a work tool area, associated with a machine of the plurality of machines, for purposes of identifying a potential collision between the machine and another machine of the plurality of machines. In some implementations, the work tool area is ignored based on a type of the machine and a type of the other machine.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

INDUSTRIAL APPLICABILITY

The disclosed CAAS (e.g., CAAS 604) may be used with any machine where collision threat filtering, associated with collision awareness and/or collision avoidance functionality provided by the CAAS, is desired. The disclosed CAAS may filter potential collisions such that a collision prevention action, associated with a given potential collision, is selectively performed depending on whether the given potential collision is filtered. In particular, the disclosed CAAS may identify a potential collision between a first machine (e.g., a first machine 602) of a plurality of machines (e.g., a plurality of machines 602) and a second machine (e.g., a second machine 602) of the plurality of machines. Next, the CAAS may determine (e.g., based on a set of filtering parameters and machine information associated with at least one of the first machine or the second machine) whether to filter the potential collision, and may selectively perform a collision prevention action, associated with the potential collision, based on whether the potential collision is to be filtered. As a result, a machine may operate in close proximity to one or more other machines, while avoiding false alarms and/or unnecessary intervention with operation of the machine.

This collision threat filtering improves overall operation and utility of the CAAS by, for example, reducing false alarms and/or unwanted operational intervention. Further, the collision threat filtering reduces distraction to an operator of the machine (e.g., caused by false alarms). Additionally, the collision threat filtering improves accuracy of the CAAS (e.g., in terms of detecting actual collisions).

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   determining, by a system, trajectory information associated with a plurality of machines;
   determining, by the system and based on the trajectory information, that a first area of a first machine, of the plurality of machines, will overlap with a second area of a second machine, of the plurality of machines, at a future point in time;
   identifying, by the system and based on determining that the first area of the first machine will overlap with the second area of the second machine, one or more potential collisions among the plurality of machines,
      wherein the one or more potential collisions include a potential collision, between the first machine and the second machine, that is identified based on determining that the first area of the first machine will overlap with the second area of the second machine;
   determining, by the system, whether to filter the potential collision,
      wherein whether the potential collision is filtered is determined based on a set of filtering parameters and machine information associated with at least one of the first machine or the second machine,
      wherein the set of filtering parameters includes a filter map for a type of machine of the first machine, and
      wherein the filter map indicates one or more approach directions that are allowed and one or more approach directions that are disallowed; and
   selectively performing, by the system, a collision prevention action, associated with the potential collision, based on whether the potential collision is to be filtered.

2. The method of claim 1, wherein determining whether to filter the potential collision comprises:
   determining whether a speed of the first machine is less than or equal to a maximum filtering speed of the first machine; and
   determining whether a speed of the second machine is less than or equal to a maximum filtering speed of the second machine,
      wherein the set of filtering parameters further includes information that identifies the maximum filtering speed of the first machine and the maximum filtering speed of the second machine, and
      wherein the machine information includes information that identifies the speed of the first machine and the speed of the second machine.

3. The method of claim 1, wherein determining whether to filter the potential collision comprises:
   determining whether an approach direction, associated with the first machine, matches one of a set of allowable approach directions associated with the first machine; and
   determining whether an approach direction, associated with the second machine, matches one of a set of allowable approach directions associated with the second machine,
      wherein the set of filtering parameters further includes a different filter map that indicates the set of allowable approach directions associated with the second machine,
      wherein the filter map indicates the set of allowable approach directions associated with the first machine,
      wherein the set of allowable approach directions associated with the first machine include the one or more approach directions that are allowed, and
      wherein the machine information includes information that identifies the approach direction associated with the first machine and the approach direction associated with the second machine.

4. The method of claim 3, further comprising:
   identifying the set of allowable approach directions associated with the first machine and the set of allowable approach directions associated with the second machine based on at least one of:
      the type of machine of the first machine and a type of machine of the second machine; or
      an identifier of the first machine and an identifier of the second machine.

5. The method of claim 3, wherein the set of allowable approach directions associated with the first machine and the set of allowable approach directions associated with the second machine are sets of linear approach directions.

6. The method of claim 3, wherein the set of allowable approach directions associated with the first machine is a set of linear approach directions and the set of allowable approach directions associated with the second machine is a set of radial approach directions.

7. The method of claim 3, wherein the set of allowable approach directions associated with the second machine is a set of linear approach directions and the set of allowable approach directions associated with the first machine is a set of radial approach direction.

8. The method of claim 1, wherein, when the potential collision is to be filtered, selectively performing the collision prevention action comprises:
   operating such that no collision warning, associated with the potential collision, is provided, and such that no collision avoidance action, associated with avoiding the potential collision, is performed.

9. The method of claim 1, wherein, when the potential collision is not to be filtered, selectively performing the collision prevention action comprises:
   providing a collision warning in association with warning an operator of the potential collision; or
   cause a collision avoidance action, associated with avoiding the potential collision, to be performed.

10. The method of claim 1, wherein identifying the potential collisions among the plurality of machines comprises:
    ignoring a work tool area, associated with the first machine, for purposes of identifying a potential collision between the first machine and the second machine,
       wherein the work tool area is ignored based on the type of machine of the first machine and a type of machine of the second machine.

11. A system comprising:
    one or more devices to:
       determine trajectory information associated with a plurality of machines;
       determine, based on the trajectory information, that a first area of a first machine, of the plurality of machines, will overlap with a second area of a second machine, of the plurality of machines, at a future point in time;
       identify, based on determining that the first area of the first machine will overlap with the second area of the second machine, potential collisions among the plurality of machines,
          wherein the potential collisions include a potential collision, between the first machine and the second machine, that is identified based on determining that the first area of the first machine will overlap with the second area of the second machine;
determine whether to filter the potential collision,
wherein whether the potential collision is filtered is determined based on a set of filtering parameters and machine information associated with at least one of the first machine or the second machine,
wherein the set of filtering parameters includes a filter map for a type of machine of the first machine, and
wherein the filter map indicates one or more approach directions that are allowed and one or more approach directions that are disallowed; and
selectively perform a collision prevention action, associated with the potential collision, based on whether the potential collision is to be filtered.

12. The system of claim 11, wherein the one or more devices, when determining whether to filter the potential collision, are to:
determine whether a speed of the first machine is less than or equal to a maximum filtering speed of the first machine; and
determine whether a speed of the second machine is less than or equal to a maximum filtering speed of the second machine,
wherein the set of filtering parameters further includes information that identifies the maximum filtering speed of the first machine and the maximum filtering speed of the second machine, and
wherein the machine information includes information that identifies the speed of the first machine and the speed of the second machine.

13. The system of claim 11, wherein the one or more devices, when determining whether to filter the potential collision, are to:
determine whether an approach direction associated, with the first machine, matches one of a set of allowable approach directions associated with the first machine; and
determine whether an approach direction, associated with the second machine, matches one of a set of allowable approach directions associated with the second machine,
wherein the set of filtering parameters further includes a different filter map that indicates the set of allowable approach directions associated with the second machine,
wherein the filter map indicates the set of allowable approach directions associated with the first machine,
wherein the set of allowable approach directions associated with the first machine include the one or more approach directions that are allowed, and
wherein the machine information includes information that identifies the approach direction associated with the first machine and the approach direction associated with the second machine.

14. The system of claim 13, wherein the one or more devices are further to:
identify the set of allowable approach directions associated with the first machine and the set of allowable approach directions associated with the second machine based on at least one of:
the type of machine of the first machine and a type of machine of the second machine; or
an identifier of the first machine and an identifier of the second machine.

15. The system of claim 11, wherein, when the potential collision is to be filtered, the one or more devices, when selectively performing the collision prevention action, are to:
operate such that no collision warning, associated with the potential collision, is provided, and such that no collision avoidance action, associated with avoiding the potential collision, is performed.

16. The system of claim 11, wherein, when the potential collision is not to be filtered, the one or more devices, when selectively performing the collision prevention action, are to at least one of:
provide a collision warning in association with warning an operator of the potential collision; or
cause a collision avoidance action, associated with avoiding the potential collision, to be performed.

17. The system of claim 11, wherein the one or more devices, when identifying the potential collisions among the plurality of machines, are to:
ignore a work tool area, associated with the first machine, for purposes of identifying a potential collision between the first machine and the second machine,
wherein the work tool area is ignored based on the type of machine of the first machine and a type of machine of the second machine.

18. A machine, comprising:
a system to:
determine trajectory information associated with a plurality of machines,
wherein the plurality of machines includes the machine;
determine, based on the trajectory information, that a first area of the machine will overlap with a second area of another machine of the plurality of machines;
identify, based on determining that the first area of the machine will overlap with the second area of the other machine, a potential collision between the machine and the other machine;
determine whether to filter the potential collision between the machine and the other machine,
wherein whether the potential collision is filtered is determined based on a set of filtering parameters and machine information associated with at least one of the machine or the other machine,
wherein the set of filtering parameters includes a filter map for a type of machine of the machine, and
wherein the filter map indicates one or more approach directions that are allowed and one or more approach directions that are disallowed; and
selectively perform a collision prevention action, associated with the potential collision, based on whether the potential collision is to be filtered.

19. The machine of claim 18, wherein the system, when determining whether to filter the potential collision, is to:
determine whether a speed of the machine is less than or equal to a maximum filtering speed of the machine; and
determine whether a speed of the other machine is less than or equal to a maximum filtering speed of the other machine,
wherein the set of filtering parameters further includes information that identifies the maximum filtering speed of the machine and the maximum filtering speed of the other machine, and wherein the machine information includes information that identifies the speed of the machine and the speed of the other machine.

20. The machine of claim 18,
wherein the first area of the machine is a body area of the machine, and
wherein the body area of the machine is different from a work tool area of the machine.

\* \* \* \* \*